(12) United States Patent
Jan et al.

(10) Patent No.: US 10,895,894 B2
(45) Date of Patent: Jan. 19, 2021

(54) ELECTRONIC DEVICE

(71) Applicants: Cheng-Shiue Jan, Taipei (TW); Wei-Hao Lan, Taipei (TW); Pai-Feng Chen, Taipei (TW); Han-Tsai Liu, Taipei (TW); Ying-Hua Chiang, Taipei (TW); Jyh-Chyang Tzou, Taipei (TW)

(72) Inventors: Cheng-Shiue Jan, Taipei (TW); Wei-Hao Lan, Taipei (TW); Pai-Feng Chen, Taipei (TW); Han-Tsai Liu, Taipei (TW); Ying-Hua Chiang, Taipei (TW); Jyh-Chyang Tzou, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/709,849

(22) Filed: Dec. 10, 2019

(65) Prior Publication Data
US 2020/0201400 A1 Jun. 25, 2020

Related U.S. Application Data

(60) Provisional application No. 62/784,764, filed on Dec. 25, 2018.

(51) Int. Cl.
*G06F 1/16* (2006.01)
(52) U.S. Cl.
CPC .......... *G06F 1/1681* (2013.01); *G06F 1/1616* (2013.01); *G06F 1/1652* (2013.01)
(58) Field of Classification Search
CPC ..... G06F 1/1681; G06F 1/1616; G06F 1/1652
See application file for complete search history.

(56) References Cited

U.S. PATENT DOCUMENTS

| | | | | |
|---|---|---|---|---|
| 9,348,450 | B1* | 5/2016 | Kim | G06F 3/0412 |
| 9,470,404 | B2* | 10/2016 | Lee | G09F 9/301 |
| 9,791,891 | B2* | 10/2017 | Jung | G06F 1/1652 |
| 9,826,626 | B2* | 11/2017 | Myeong | G06F 1/1681 |
| 9,844,251 | B2* | 12/2017 | Lin | G06F 1/1615 |
| 9,910,458 | B2* | 3/2018 | Watanabe | G02F 1/133305 |
| 10,550,880 | B2* | 2/2020 | Hsu | G06F 1/1652 |

(Continued)

FOREIGN PATENT DOCUMENTS

TW 201716912 5/2017

*Primary Examiner* — Abhishek M Rathod
(74) *Attorney, Agent, or Firm* — JCIPRNET

(57) ABSTRACT

An electronic device includes a first body, a second body, a hinge structure, an ascending/descending mechanism, and a flexible screen. The hinge structure is located between the first body and the second body, and the first body is connected to the second body through the hinge structure. At least one of the first body and the second body has an accommodating space. The ascending/descending mechanism is disposed in the accommodating space and connected to the hinge structure. The flexible screen includes a first bonding portion fixed to the first body, a second bonding portion fixed to the second body, and a bending portion located between the first and second bonding portions. The bending portion is aligned to the hinge structure and the ascending/descending mechanism. The ascending/descending mechanism is driven by the hinge structure to ascend or descend, so that the bending portion moves out of or into the accommodating space.

11 Claims, 6 Drawing Sheets

(56) References Cited

U.S. PATENT DOCUMENTS

| | | | |
|---|---|---|---|
| 10,551,880 B1* | 2/2020 | Ai | G06F 1/1641 |
| 10,571,962 B2* | 2/2020 | Araki | G06F 1/1652 |
| 10,694,623 B2* | 6/2020 | Park | H05K 5/0017 |
| 10,716,228 B2* | 7/2020 | You | G06F 1/1616 |
| 2015/0233162 A1* | 8/2015 | Lee | G06F 1/1626 |
| | | | 16/223 |
| 2016/0085265 A1* | 3/2016 | Park | G06F 1/1681 |
| | | | 361/807 |
| 2016/0378203 A1* | 12/2016 | Kim | G06F 1/1679 |
| | | | 345/156 |
| 2019/0179373 A1* | 6/2019 | Cheng | H04M 1/0268 |
| 2020/0081502 A1* | 3/2020 | Lin | H04M 1/0214 |
| 2020/0103935 A1* | 4/2020 | Hsu | G06F 1/1681 |

\* cited by examiner

ELECTRONIC DEVICE

CROSS-REFERENCE TO RELATED APPLICATION

This application claims the priority benefit of U.S. provisional application Ser. No. 62/784,764, filed on Dec. 25, 2018. The entirety of the above-mentioned patent application is hereby incorporated by reference herein and made a part of this specification.

TECHNICAL FIELD

The invention relates to an electronic device, and particularly relates to an electronic device integrated with a flexible screen.

DESCRIPTION OF RELATED ART

Along with development of display technology, technology of flexible screens has gradually become matured. In recent years, major electronics manufacturers have been actively dedicated to development and application of the flexible screens. Taking flexible screens integrated with electronic devices such as smart phones, tablets, or notebook computers as an example, the common design patterns are outward folding design and inward folding design. The so-called outward folding design refers to a design that a display surface of the flexible screen faces outward after folding, and the so-called inward folding design refers to a design that the display surface of the flexible screen faces inward after folding.

Generally, the flexible screen may be roughly divided into two bonding portions and a bending portion, where the two bonding portions are respectively fixed to two bodies of the electronic device, and the bending portion is located between the two bonding portions. As to the inward folding design, after the flexible screen is bent, the bending portion is deformed, and how to avoid the bent and deformed bending portion from being squeezed and damaged by the two bodies has become an issue to be resolved instantly.

SUMMARY

The invention is directed to an electronic device, which is adapted to reduce a risk of damage to a flexible screen of the electronic device.

The invention provides an electronic device including a first body, a second body, a hinge structure, an ascending/descending mechanism, and a flexible screen. The hinge structure is located between the first body and the second body, and the first body is connected to the second body through the hinge structure. At least one of the first body and the second body has an accommodating space facing the hinge structure. The ascending/descending mechanism is disposed in the accommodating space and connected to the hinge structure. The ascending/descending mechanism includes a driving rod, a first driven rod, a support rod, and a second driven rod, and two ends of the driving rod are respectively pivotally connected to the hinge structure and the first driven rod, where the first driven rod and the second driven rod are arranged in parallel, and the first driven rod and the second driven rod are respectively pivotally connected to two ends of the support rod. The flexible screen includes a first bonding portion fixed to the first body, a second bonding portion fixed to the second body, and a bending portion located between the first bonding portion and the second bonding portion. The bending portion is aligned to the hinge structure and the ascending/descending mechanism, and the support rod contacts the bending portion of the flexible screen. The ascending/descending mechanism is configured to be driven by the hinge structure to ascend or descend, such that the bending portion of the flexible screen moves out of or moves into the accommodating space.

In an embodiment of the invention, the ascending/descending mechanism further includes a support plate fixed to the support rod, and the support rod contacts the bending portion of the flexible screen through the support plate.

In an embodiment of the invention, the ascending/descending mechanism further includes a first rotation fulcrum and a second rotation fulcrum fixed into the accommodating space. The first driven rod is pivotally connected to the first rotation fulcrum, and the second driven rod is pivotally connected to the second rotation fulcrum.

In an embodiment of the invention, a pivot point of the driving rod on the first driven rod is located between the support rod and the first rotation fulcrum.

In an embodiment of the invention, the first body is pivotally connected to the hinge structure along a first axis, the second body is pivotally connected to the hinge structure along a second axis, the driving rod is pivotally connected to the hinge structure along a third axis, and the first axis, the second axis, and the third axis are parallel to each other.

In an embodiment of the invention, the hinge structure includes a hinge housing and a holder base, and the holder base is disposed in the hinge housing. The driving rod extends into the hinge housing and is pivotally connected to the holder base.

In an embodiment of the invention, the electronic device further includes a first bracket and a second bracket, and each of the first bracket and the second bracket includes a fixing portion and a rotating shaft portion. The fixing portion of the first bracket is fixed to the first body, and the rotating shaft portion of the first bracket is pivotally connected to the hinge housing. The fixing portion of the second bracket is fixed to the first body, and the rotating shaft portion of the second bracket is pivotally connected to the hinge housing.

In an embodiment of the invention, the rotating shaft portion of the first bracket and the rotating shaft portion of the second bracket are arranged in parallel in the hinge housing.

In an embodiment of the invention, the electronic device further includes a third bracket and a fourth bracket, and each of the third bracket and the fourth bracket includes a fixing portion and a pivot portion. The fixing portion of the third bracket is fixed to the first body, and the pivot portion of the third bracket is pivotally connected to the holder base. The fixing portion of the fourth bracket is fixed to the second body, and the pivot portion of the fourth bracket is pivotally connected to the holder base.

In an embodiment of the invention, the pivot portion of the third bracket and the pivot portion of the fourth bracket are arranged in parallel in the hinge housing.

In an embodiment of the invention, each of the first body and the second body has the accommodating space facing the hinge structure, and the number of the ascending/descending mechanism is two. The two ascending/descending mechanisms are respectively disposed in the accommodating space of the first body and the accommodating space of the second body.

Based on the above, in the electronic device of the invention, at least one of the first body and the second body has the accommodating space for the bending portion of the flexible screen that is bent and deformed to move in. When the electronic device is in a closed state, the bending portion of the flexible screen is bent and deformed and moved into the accommodating space, so as to prevent the bending portion from being squeezed and damaged by the first body and the second body.

To make the aforementioned more comprehensible, several embodiments accompanied with drawings are described in detail as follows.

DESCRIPTION OF THE EMBODIMENTS

Figure 1A:
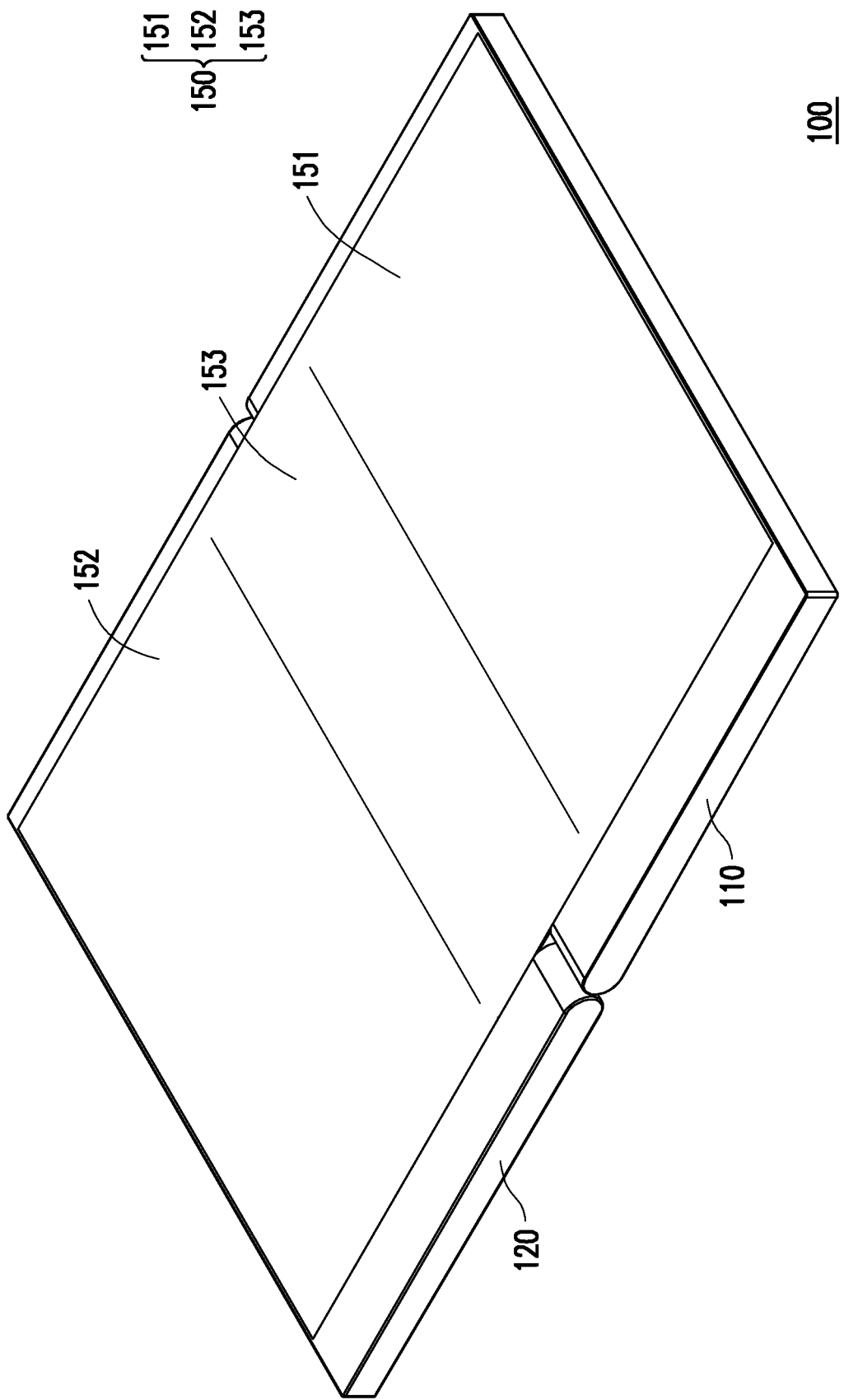
FIG. 1A is a schematic diagram of an electronic device in a first state according to an embodiment of the invention.
Figure 1B:
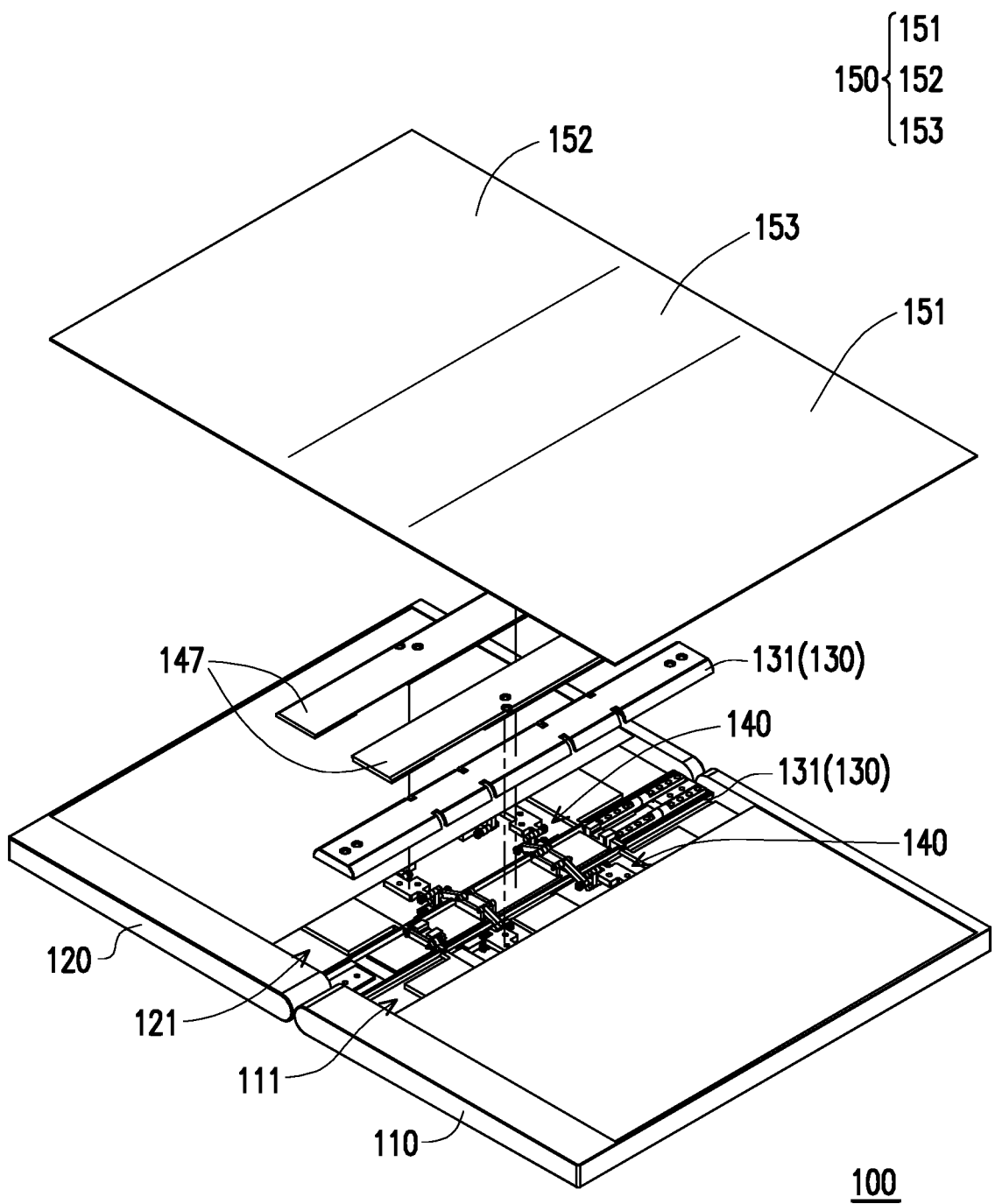
FIG. 1B is a schematic partial exploded view of the electronic device of FIG. 1A.
Figure 1C:
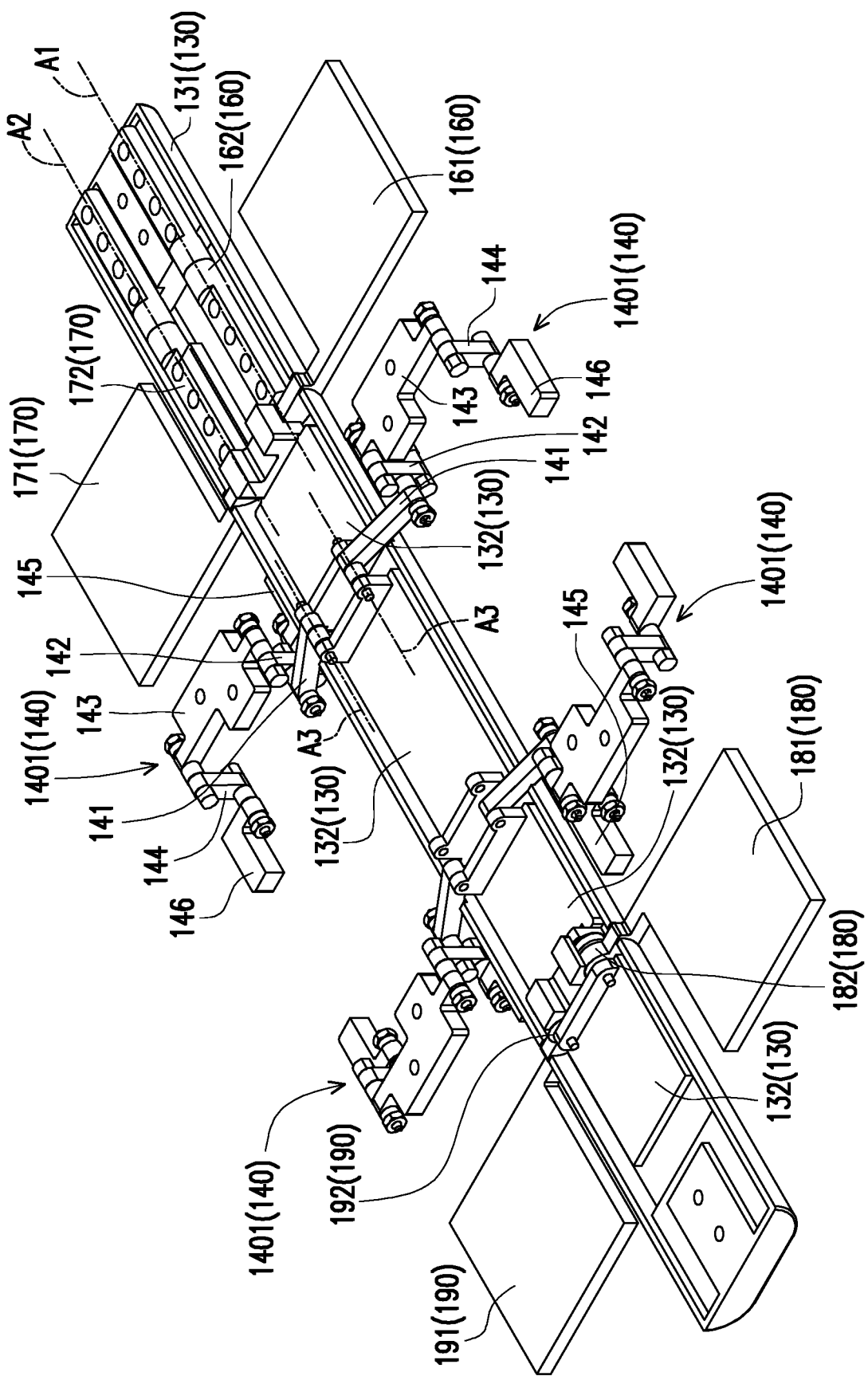
FIG. 1C is a schematic partial enlarged view of a hinge structure and an ascending/descending mechanism of FIG. 1B.
Figure 1D:
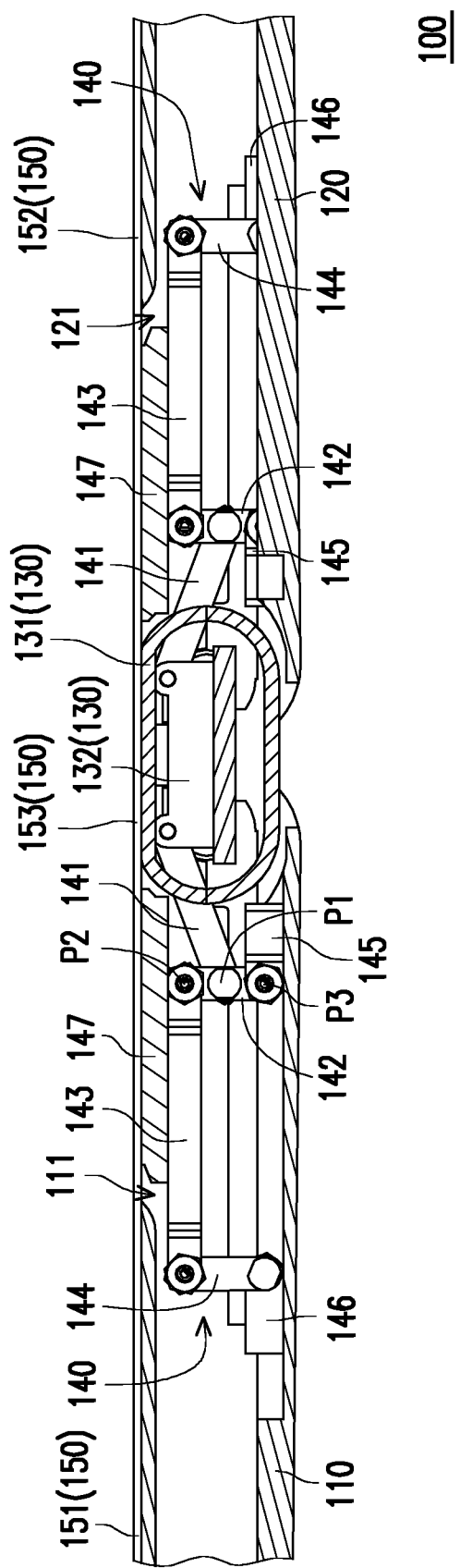
FIG. 1D is a schematic partial cross-sectional view of the electronic device of FIG. 1A.

FIG. 1A is a schematic diagram of an electronic device in a first state according to an embodiment of the invention. FIG. 1B is a schematic partial exploded view of the electronic device of FIG. 1A. FIG. 1C is a schematic partial enlarged view of a hinge structure and an ascending/descending mechanism of FIG. 1B. FIG. 1D is a schematic partial cross-sectional view of the electronic device of FIG. 1A. It should be noted that a first body 110 and a second body 120 are omitted in FIG. 1C.

First, With reference to FIG. 1A to FIG. 1C, in the embodiment, the electronic device 100 may be a display, a tablet Personal Computer (PC), a smart phone or a notebook computer, and the first state of the electronic device 100 is an expanded state. In detail, the electronic device 100 includes a first body 110, a second body 120, a hinge structure 130, an ascending/descending mechanism 140 and a flexible screen 150, where the hinge structure 130 is located between the first body 110 and the second body 120, and the first body 110 is connected to the second body 120 through the hinge structure 130. The first body 110 is pivotally connected to the hinge structure 130, and the second body 120 is pivotally connected to the hinge structure 130. Therefore, the first body 110 and the second body 120 may be rotated relative to the hinge structure 130 individually or simultaneously to switch the electronic device 100 to another use state, or the first body 110 and the hinge structure 130 may be simultaneously rotated relative to the second body 120 to switch the electronic device 100 to another use state, or the second body 120 and the hinge structure 130 may be simultaneously rotated relative to the first body 110 to switch the electronic device 100 to another use state.

The flexible screen 150 may be integrated with a touch function, and adopts an inward folding design. Therefore, after the electronic device 100 is switched to a closed state, a display surface of the flexible screen 150 faces inward, thereby preventing the flexible screen 150 from being scratched. In detail, the flexible screen 150 includes a first bonding portion 151 fixed to the first body 110, a second bonding portion 152 fixed to the second body 120, and a bending portion 153 located between the first bonding portion 151 and the second bonding portion 152, where the bending portion 153 extends from the first body 110 to the second body 120 and is aligned to the hinge structure 130, as shown in FIG. 1A and FIG. 1D.

During a process of switching the electronic device 100 to different use states, the first bonding portion 151 is moved synchronously along with the first body 110, and the second bonding portion 152 is moved synchronously along with the rotation of the second body 120, and the first bonding portion 151 and the second bonding portion 152 are not deformed. Moreover, the bending portion 153 is pulled by the first body 110 and the second body 120 to expand, or pushed by the first body 110 and the second body 120 to bend and deform.

With reference to FIG. 1B to FIG. 1D, in the embodiment, the first body 110 has an accommodating space 111 facing the hinge structure 130, and the second body 120 has an accommodating space 121 facing the hinge structure 130. For example, the accommodating space 111 may be a recessed space on the first body 110, and the accommodating space 121 may be a recessed space on the second body 120. The accommodating space 111 and the accommodating space 121 are symmetrically disposed at two sides of the hinge structure 130, and the bending portion 153 of the flexible screen 150 extends through the top of the accommodating space 111, the hinge structure 130 and the accommodating space 121.

In detail, the number of the ascending/descending mechanisms 140 is two, and the two ascending/descending mechanisms 140 are symmetrically disposed at the two sides of the hinge structure 130, and the two ascending/descending mechanisms 140 are respectively disposed in the accommodating space 111 of the first body 110 and the second accommodating space 121 of the second body 120. Since the bending portion 153 of the flexible screen 150 extends through the top of the accommodating space 111, the hinge structure 130 and the accommodating space 121, the flexible screen 150 is aligned to the two ascending/descending mechanisms 140.

In other embodiments, the number of the accommodating space and the number of the ascending/descending mechanism are respectively one, for example, if the first body has the accommodating space, the ascending/descending mechanism is then disposed in the accommodating space of the first body, and if the second body has the accommodating space, the ascending/descending mechanism is then disposed in the accommodating space of the second body.

In the embodiment, the two ascending/descending mechanisms 140 are connected to the hinge structure 130, and along with the relative rotation of the first body 110 and the hinge structure 130 or along with the relative rotation of the second body 120 and the hinge structure 130, the ascending/descending mechanisms 140 are driven by the hinge structure 130 to ascend or descend. For example, the two ascending/descending mechanisms 140 shown in FIG. 1D are all in an ascending state to support the bending portion 153 of the flexible screen 150, so that the bending portion 153 is moved out of the accommodating space 111 of the first body 110 and the accommodating space 121 of the second body 120 to maintain flatness of the flexible screen 150.

With reference to FIG. 1B to FIG. 1D, each of the ascending/descending mechanisms 140 includes a driving rod 141, a first driven rod 142, a support rod 143, and a second driven rod 144, where two ends of the driving rod 141 are respectively pivotally connected to the hinge structure 130 and the first driven rod 142, and the first driven rod 142 and the second driven rod 144 are respectively pivotally connected to two ends of the support rod. The first driven rod 142 is closer to the hinge structure 130 than the second driven rod 144, and the support rod 143 contacts the bending portion 153 of the flexible screen 150. Taking the ascending/descending mechanism 140 disposed in the first body 110 as an example, the first driven rode 142 and the second driven rod 144 are arranged in parallel, and are pivotally connected to the first body 110. Taking the ascending/descending mechanism 140 disposed in the second body 120 as an example, the first driven rode 142 and the second driven rod 144 are arranged in parallel, and are pivotally connected to the second body 120. For example, the first driven rode 142 and the second driven rod 144 are parallel with each other, and a length of the first driven rod 142 is equal to a length of the second driven rod 144. In this way, during the ascending or descending process of each of the ascending/descending mechanisms 140, the support rod 143 may be parallel to the bottom of the first body 110 or the second body 120.

Each of the ascending/descending mechanisms 140 further includes a first rotation fulcrum 145 and a second rotation fulcrum 146, and the first rotation fulcrum 145 and the second rotation fulcrum 146 may be support bases. Taking the ascending/descending mechanism 140 disposed in the first body 110 as an example, the first rotation fulcrum 145 and the second rotation fulcrum 146 are fixed into the accommodating space 111, where the first rotation fulcrum 145 is closer to the hinge structure 130 than the second rotation fulcrum 146, and the first driven rod 142 and the second driven rod 144 are respectively pivotally connected to the first rotation fulcrum 145 and the second rotation fulcrum 146. Taking the ascending/descending mechanism 140 disposed in the second body 120 as an example, the first rotation fulcrum 145 and the second rotation fulcrum 146 are fixed into the accommodating space 121, where the first rotation fulcrum 145 is closer to the hinge structure 130 than the second rotation fulcrum 146, and the first driven rod 142 and the second driven rod 144 are respectively pivotally connected to the first rotation fulcrum 145 and the second rotation fulcrum 146.

In each of the ascending/descending mechanisms 140, a pivot point P1 of the driving rod 141 on the first driven rod 142 is located between the support rod 143 and the first rotation fulcrum 145. Specifically, a pivot point P2 of the support rod 143 on the first driven rod 142 and a pivot point P3 of the first rotation fulcrum 145 on the first driven rod 142 are located at two sides of the pivot point P1. On the other hand, the first body 110 is pivotally connected to the hinge structure 130 along a first axis A1, and the second body 120 is pivotally connected to the hinge structure 130 along a second axis A2. The driving rod 141 is pivotally connected to the hinge structure 130 along a third axis A3, where the first axis A1, the second axis A2 and the third axis A3 are parallel with each other and are not coaxial.

Based on the above design, taking the ascending/descending mechanism 140 disposed in the first body 110 as an example, during a process that the hinge structure 130 is rotated relative to the first body 110, the driving rod 141 may be pushed by the hinge structure 130 to drive the first driven rod 142, the support rod 143 and the second driven rod 144 to move. Taking the ascending/descending mechanism 140 disposed in the second body 120 as an example, during a process that the hinge structure 130 is rotated relative to the second body 120, the driving rod 141 may be pushed by the hinge structure 130 to drive the first driven rod 142, the support rod 143 and the second driven rod 144 to move.

Figure 2:
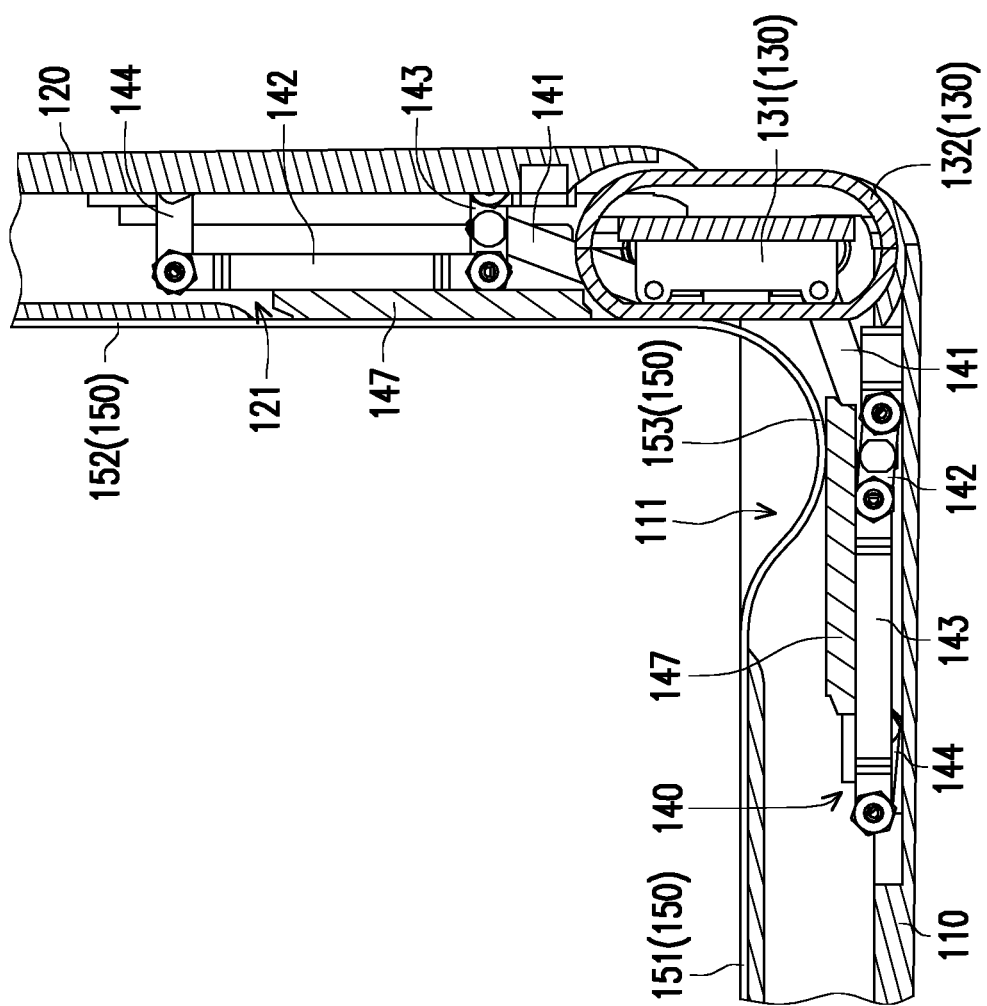
FIG. 2 is a schematic partial cross-sectional view of the electronic device of FIG. 1D in a second state.

FIG. 2 is a schematic partial cross-sectional view of the electronic device of FIG. 1D in a second state. With reference to FIG. 1D and FIG. 2, regarding the ascending/descending mechanism 140 disposed in the first body 110, when the second body 120 and the hinge structure 130 are rotated relative to the first body 110, the ascending/descending mechanism 140 is driven by the hinge structure 130 to descend, so that the bending portion 153 originally located outside the accommodating space 111 of the first body 110 is bent and deformed to move into the accommodating space 111. To be specific, when the second body 120 and the hinge structure 130 are rotated relative to the first body 110, the hinge structure 130 drives the driving rod 141, and the first driven rod 142 is pushed by the driving rod 141 to rotate relative to the first body 110.

Based on the connection relationship between the first driven rod 142, the support rod 143 and the second driven rod 144, the first driven rod 142 and the second driven rod 144 are synchronously rotated relative to the first body 110 in a same direction and move to the bottom of the first body 110, so that the support rod 143 descends. Meanwhile, the bending portion 153 originally located outside the accommodating space 111 of the first body 110 is bent and deformed to move into the accommodating space 111.

In the second state shown in FIG. 2, the second body 120 and the hinge structure 130 are rotated by 90 degrees with respect to the first body 110, where the first bonding portion 151 of the flexible screen 150 located on the first body 110 may be used to display a virtual keyboard, and the second bonding portion 152 of the flexible screen 150 located on the second body 120 may be used to display an operation image.

Figure 3:
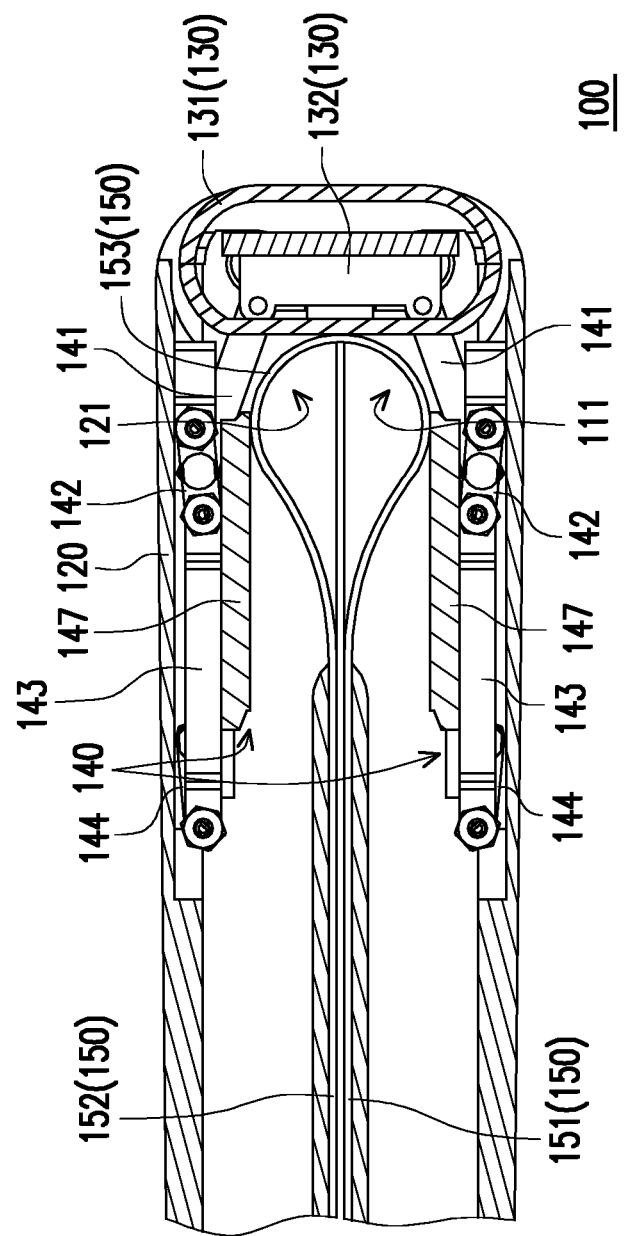
FIG. 3 is a schematic partial cross-sectional view of the electronic device of FIG. 2 in a third state.

FIG. 3 is a schematic partial cross-sectional view of the electronic device of FIG. 2 in a third state. With reference to FIG. 2 and FIG. 3, regarding the ascending/descending mechanism 140 disposed in the second body 120, when the second body 120 is rotated relative to the hinge structure 130, the ascending/descending mechanism 140 is driven by the hinge structure 130 to descend, so that the bending portion 153 originally located outside the accommodating space 121 of the second body 120 is bent and deformed to move into the accommodating space 121. To be specific, when the second body 120 is rotated relative to the hinge structure 130, the hinge structure 130 drives the driving rod 141, and the first driven rod 142 is pushed by the driving rod 141 to rotate relative to the second body 120. Based on the connection relationship between the first driven rod 142, the support rod 143 and the second driven rod 144, the first driven rod 142 and the second driven rod 144 are synchronously rotated relative to the second body 120 in a same direction and move to the bottom of the second body 120, so that the support rod 143 descends. Meanwhile, the bending portion 153 originally located outside the accommodating space 121 of the second body 120 is bent and deformed to move into the accommodating space 121.

As shown in FIG. 3, the third state of the electronic device 100 is the closed state, and the bent and deformed bending portion 153 of the flexible screen 150 is moved into the accommodating space 111 of the first body 110 and the accommodating space 121 of the second body 120 to prevent the bending portion 153 from being squeezed and damaged by the first body 110 and the second body 120.

With reference to FIG. 1C and FIG. 1D, each of the ascending/descending mechanisms 140 may include two linkages 1401, and each of the linkages 1401 includes the driving rod 141, the first driven rod 142, the support rod 143, the second driven rod 144, the first rotation fulcrum 145, and the second rotation fulcrum 146. Each of the ascending/descending mechanisms 140 further includes a support plate 147, and the support plate 147 is supported by the two linkages 1401 to improve stability of the support plate 147 in movement. In each of the ascending/descending mechanisms 140, the support plate 147 is fixed to the two support rods 143 of the two linkages 1401, and each support rod 143 contacts the bending portion 153 of the flexible screen 150 through the support plate 147, so as to provide a larger support area to the bending portion 153 of the flexible screen 150.

With reference to FIG. 1B, FIG. 1D and FIG. 2, in the embodiment, the hinge structure 130 includes a hinge housing 131 and a holder base 132, and the holder base 132 is disposed in the hinge housing 131. On the other hand, the driving rod 141 of each of the ascending/descending mechanisms 140 extends into the hinge housing 131 and is pivotally connected to the holder base 132. The electronic device 100 further includes a first bracket 160, a second bracket 170, a third bracket 180 and a fourth bracket 190, where the first bracket 160 and the second bracket 170 are symmetrically disposed at the two sides of the hinge structure 130, and the third bracket 180 and the fourth bracket 190 are symmetrically disposed at the two sides of the hinge structure 130.

The first body 110 is connected to the hinge structure 130 through the first bracket 160 and the third bracket 180, and the second body 120 is connected to the hinge structure 130 through the second bracket 170 and the fourth bracket 190. In detail, the first bracket 160 includes a fixing portion 161 and a rotating shaft portion 162, where the fixing portion 161 is fixed to the first body 110, and the rotating shaft portion 162 is pivotally connected to the hinge housing 131 along the first axis A1. Moreover, the hinge housing 131 has a groove for a section of the first bracket 160 located between the fixing portion 161 and the rotating shaft portion 162 to be slidably disposed therein. The second bracket 170 includes a fixing portion 171 and a rotating shaft portion 172, where the fixing portion 171 is fixed to the second body 120, and the rotating shaft portion 172 is pivotally connected to the hinge housing 131 along the second axis A2. Moreover, the hinge housing 131 has a groove for a section of the second bracket 170 located between the fixing portion 171 and the rotating shaft portion 172 to be slidably disposed therein.

The third bracket 180 includes a fixing portion 181 and a pivot portion 182, where the fixing portion 181 is fixed to the first body 110, and the pivot portion 182 is pivotally connected to the holder base 132 along the first axis A1. Moreover, the hinge housing 131 has a groove for a section of the third bracket 180 located between the fixing portion 181 and the pivot portion 182 to be slidably disposed therein. The fourth bracket 190 includes a fixing portion 191 and a pivot portion 192, where the fixing portion 191 is fixed to the second body 120, and the pivot portion 192 is pivotally connected to the holder base 132 along the second axis A2. Moreover, the hinge housing 131 has a groove for a section of the fourth bracket 190 located between the fixing portion 191 and the pivot portion 192 to be slidably disposed therein. On the other hand, the rotating shaft portion 162 of the first bracket 160 and the rotating shaft portion 172 of the second bracket 170 are arranged in parallel in the hinge housing 131, and the pivot portion 182 of the third bracket 180 and the pivot portion 192 of the fourth bracket 190 are arranged in parallel in the hinge housing 131, so as to improve stability of the electronic device when the first body 110 and the second body 120 are rotated relative to each other.

In summary, in the electronic device of the invention, at least one of the first body and the second body has the accommodating space for the bending portion of the flexible screen that is bent and deformed to move in. When the electronic device is in the closed state, the bending portion of the flexible screen is bent and deformed and moved into the accommodating space, so as to prevent the bending portion from being squeezed and damaged by the first body and the second body. On the other hand, the electronic device further includes the ascending/descending mechanism configured corresponding to the accommodating space, and along with the relative rotation of the first body and the second body, the ascending/descending mechanism ascends to support the bending portion of the flexible screen, so as to move the bending portion out of the accommodating space, or the ascending/descending mechanism descends to move the bent and deformed bending portion into the accommodating space.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents.

What is claimed is:

1. An electronic device, comprising:
   a first body;
   a second body;
   a hinge structure, located between the first body and the second body, the first body being connected to the second body through the hinge structure, wherein at least one of the first body and the second body has an accommodating space facing the hinge structure;
   an ascending/descending mechanism, disposed in the accommodating space and connected to the hinge structure, the ascending/descending mechanism comprising a driving rod, a first driven rod, a support rod, and a second driven rod, two ends of the driving rod being respectively pivotally connected to the hinge structure and the first driven rod, wherein the first driven rod and the second driven rod are arranged in parallel, and the first driven rod and the second driven rod are respectively pivotally connected to two ends of the support rod; and
   a flexible screen, comprising a first bonding portion fixed to the first body, a second bonding portion fixed to the second body, and a bending portion located between the first bonding portion and the second bonding portion, wherein the bending portion is aligned to the hinge structure and the ascending/descending mechanism, the support rod contacts the bending portion of the flexible screen, and
   the ascending/descending mechanism is configured to be driven by the hinge structure to ascend or descend, such that the bending portion of the flexible screen moves out of or moves into the accommodating space.

2. The electronic device as claimed in claim 1, wherein the ascending/descending mechanism further comprises a support plate fixed to the support rod, and the support rod contacts the bending portion of the flexible screen through the support plate.

3. The electronic device as claimed in claim 1, wherein the ascending/descending mechanism further comprises a first rotation fulcrum and a second rotation fulcrum fixed into the accommodating space, the first driven rod is pivotally connected to the first rotation fulcrum, and the second driven rod is pivotally connected to the second rotation fulcrum.

4. The electronic device as claimed in claim 3, wherein a pivot point of the driving rod on the first driven rod is located between the support rod and the first rotation fulcrum.

5. The electronic device as claimed in claim 1, wherein the first body is pivotally connected to the hinge structure along a first axis, the second body is pivotally connected to the hinge structure along a second axis, the driving rod is pivotally connected to the hinge structure along a third axis, and the first axis, the second axis, and the third axis are parallel to each other.

6. The electronic device as claimed in claim 1, wherein the hinge structure comprises a hinge housing and a holder base, the holder base is disposed in the hinge housing, and the driving rod extends into the hinge housing and is pivotally connected to the holder base.

7. The electronic device as claimed in claim 6, further comprising a first bracket and a second bracket, each of the first bracket and the second bracket comprises a fixing portion and a rotating shaft portion, the fixing portion of the first bracket is fixed to the first body, the rotating shaft portion of the first bracket is pivotally connected to the hinge housing, the fixing portion of the second bracket is fixed to the first body, and the rotating shaft portion of the second bracket is pivotally connected to the hinge housing.

8. The electronic device as claimed in claim 7, wherein the rotating shaft portion of the first bracket and the rotating shaft portion of the second bracket are arranged in parallel in the hinge housing.

9. The electronic device as claimed in claim 7, further comprising a third bracket and a fourth bracket, wherein each of the third bracket and the fourth bracket comprises a fixing portion and a pivot portion, the fixing portion of the third bracket is fixed to the first body, the pivot portion of the third bracket is pivotally connected to the holder base, the fixing portion of the fourth bracket is fixed to the second body, and the pivot portion of the fourth bracket is pivotally connected to the holder base.

10. The electronic device as claimed in claim 9, wherein the pivot portion of the third bracket and the pivot portion of the fourth bracket are arranged in parallel in the hinge housing.

11. The electronic device as claimed in claim 1, wherein each of the first body and the second body has the accommodating space facing the hinge structure, the number of the ascending/descending mechanism is two, and the two ascending/descending mechanisms are respectively disposed in the accommodating space of the first body and the accommodating space of the second body.

* * * * *